US009170383B2

(12) United States Patent
Ho et al.

(10) Patent No.: US 9,170,383 B2
(45) Date of Patent: Oct. 27, 2015

(54) MULTI-CHANNEL OPTICAL TRANSCEIVER MODULE INCLUDING DUAL FIBER TYPE DIRECT LINK ADAPTER FOR OPTICALLY COUPLING OPTICAL SUBASSEMBLIES IN THE TRANSCEIVER MODULE

(71) Applicant: Applied Optoelectronics, Inc., Sugar Land, TX (US)

(72) Inventors: I-Lung Ho, Sugar Land, TX (US); Stefan J. Murry, Houston, TX (US); Richard Yeh, New Taipei (TW)

(73) Assignee: Applied Optoelectronics, Inc., Sugar Land, TX (US)

( * ) Notice: Subject to any disclaimer, the term of this patent is extended or adjusted under 35 U.S.C. 154(b) by 224 days.

(21) Appl. No.: 13/709,195

(22) Filed: Dec. 10, 2012

(65) Prior Publication Data
US 2014/0161394 A1    Jun. 12, 2014

(51) Int. Cl.
*G02B 6/42*    (2006.01)
*G02B 6/38*    (2006.01)

(52) U.S. Cl.
CPC .............. *G02B 6/421* (2013.01); *G02B 6/4246* (2013.01); *G02B 6/4293* (2013.01); *G02B 6/38* (2013.01); *G02B 6/3807* (2013.01); *G02B 6/3869* (2013.01); *G02B 6/3874* (2013.01); *G02B 6/3877* (2013.01); *G02B 6/42* (2013.01); *G02B 6/4201* (2013.01)

(58) Field of Classification Search
CPC ...... G02B 6/42; G02B 6/4201; G02B 6/4246; G02B 6/4292; G02B 6/38; G02B 6/3807; G02B 6/3869; G02B 6/3877

USPC ........ 385/53, 55, 84, 88, 89, 92, 94, 134, 139
See application file for complete search history.

(56) References Cited

U.S. PATENT DOCUMENTS

| | | | |
|---|---|---|---|
| 6,350,063 B1 | 2/2002 | Gilliland et al. | |
| 7,090,509 B1 | 8/2006 | Gilliland et al. | |
| 2006/0215970 A1* | 9/2006 | Mizue et al. | 385/92 |
| 2010/0232757 A1 | 9/2010 | Shiroshita | |
| 2011/0103797 A1* | 5/2011 | Oki et al. | 398/79 |
| 2011/0225792 A1* | 9/2011 | Oki et al. | 29/428 |
| 2011/0229095 A1* | 9/2011 | Oki | 385/92 |
| 2011/0229096 A1* | 9/2011 | Oki | 385/92 |
| 2011/0255831 A1* | 10/2011 | Oki et al. | 385/78 |
| 2011/0262078 A1* | 10/2011 | Oki et al. | 385/78 |
| 2012/0275784 A1* | 11/2012 | Soto et al. | 398/38 |
| 2013/0156418 A1* | 6/2013 | Stapleton et al. | 398/25 |

* cited by examiner

*Primary Examiner* — Ryan Lepisto
*Assistant Examiner* — Guy Anderson
(74) *Attorney, Agent, or Firm* — Grossman Tucker Perreault & Pfleger, PLLC; Norman S. Kinsella

(57) ABSTRACT

A multi-channel optical transceiver includes a multi-channel transmitter optical subassembly (TOSA), a multi-channel receiver optical subassembly (ROSA), and a dual fiber type direct link adapter directly linked to the multi-channel TOSA and the multi-channel ROSA with optical fibers. The dual fiber type direct link adapter is also configured to receive pluggable optical connectors, such as LC connectors, mounted at the end of fiber-optic cables including optical fibers for carrying optical signals to and from the transceiver. The dual fiber type direct link adapter thus provides the optical input and output to the transceiver for the optical signals received by the ROSA and transmitted by the TOSA. The multi-channel optical transceiver may be used in a wavelength division multiplexed (WDM) optical system, for example, in an optical line terminal (OLT) in a WDM passive optical network (PON).

12 Claims, 6 Drawing Sheets

MULTI-CHANNEL OPTICAL TRANSCEIVER MODULE INCLUDING DUAL FIBER TYPE DIRECT LINK ADAPTER FOR OPTICALLY COUPLING OPTICAL SUBASSEMBLIES IN THE TRANSCEIVER MODULE

TECHNICAL FIELD

The present disclosure relates to multi-channel optical transceiver modules and more particularly, to a multi-channel transceiver module including a dual fiber type direct link adapter for optically coupling optical subassemblies in the transceiver module.

BACKGROUND INFORMATION

Optical communications networks, at one time, were generally "point to point" type networks including a transmitter and a receiver connected by an optical fiber. Such networks are relatively easy to construct but deploy many fibers to connect multiple users. As the number of subscribers connected to the network increases and the fiber count increases rapidly, deploying and managing many fibers becomes complex and expensive.

A passive optical network (PON) addresses this problem by using a single "trunk" fiber from a transmitting end of the network, such as an optical line terminal (OLT), to a remote branching point, which may be up to 20 km or more. One challenge in developing such a PON is utilizing the capacity in the trunk fiber efficiently in order to transmit the maximum possible amount of information on the trunk fiber. Fiber optic communications networks may increase the amount of information carried on a single optical fiber by multiplexing different optical signals on different wavelengths using wavelength division multiplexing (WDM). In a WDM-PON, for example, the single trunk fiber carries optical signals at multiple channel wavelengths to and from the optical branching point and the branching point provides a simple routing function by directing signals of different wavelengths to and from individual subscribers. In this case, each subscriber may be assigned one or more of the channel wavelengths on which to send and/or receive data.

To transmit and receive optical signals over multiple channel wavelengths, the OLT in a WDM-PON may include a multi-channel transmitter optical subassembly (TOSA) and a multi-channel receiver optical subassembly (ROSA). The multi-channel TOSA and the multi-channel ROSA may be connected to external optical fibers that carry the transmitted and received optical signals. Optical connectors, such as LC connectors, may be provided at the ends of the optical fibers for connecting the optical fibers to the respective multi-channel TOSA and multi-channel ROSA. OLT transceiver modules often are designed to fit a relatively small form factor. One challenge with such OLT transceiver modules is accommodating the multi-channel TOSA and ROSA in the relatively small space available in an OLT module. In particular, certain components that may be used to provide optical connections to the TOSA and ROSA, such as conventional LC adapters, may not fit within the limited space.

BRIEF DESCRIPTION OF THE DRAWINGS

These and other features and advantages will be better understood by reading the following detailed description, taken together with the drawings wherein.

DETAILED DESCRIPTION

A multi-channel optical transceiver, consistent with embodiments described herein, generally includes a multi-channel transmitter optical subassembly (TOSA), a multi-channel receiver optical subassembly (ROSA), and a dual fiber type direct link adapter directly linked to the multi-channel TOSA and the multi-channel ROSA with optical fibers. The dual fiber type direct link adapter is also configured to receive pluggable optical connectors, such as LC connectors, mounted at the end of fiber-optic cables including optical fibers for carrying optical signals to and from the transceiver. The dual fiber type direct link adapter thus provides the optical input and output to the transceiver for the optical signals received by the ROSA and transmitted by the TOSA. The multi-channel optical transceiver may be used in a wavelength division multiplexed (WDM) optical system, for example, in an optical line terminal (OLT) in a WDM passive optical network (PON).

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. The term "coupled" as used herein refers to any connection, coupling, link or the like by which signals carried by one system element are imparted to the "coupled" element and "optically coupled" refers to coupling such that light from one element is imparted to another element. Such "coupled" devices are not necessarily directly connected to one another and may be separated by intermediate components or devices that may manipulate or modify such signals. As used herein, "direct link" refers to optically coupling with a single optical fiber mechanically coupled between two components without using pluggable connectors at the ends of the fiber link.

Figure 1:
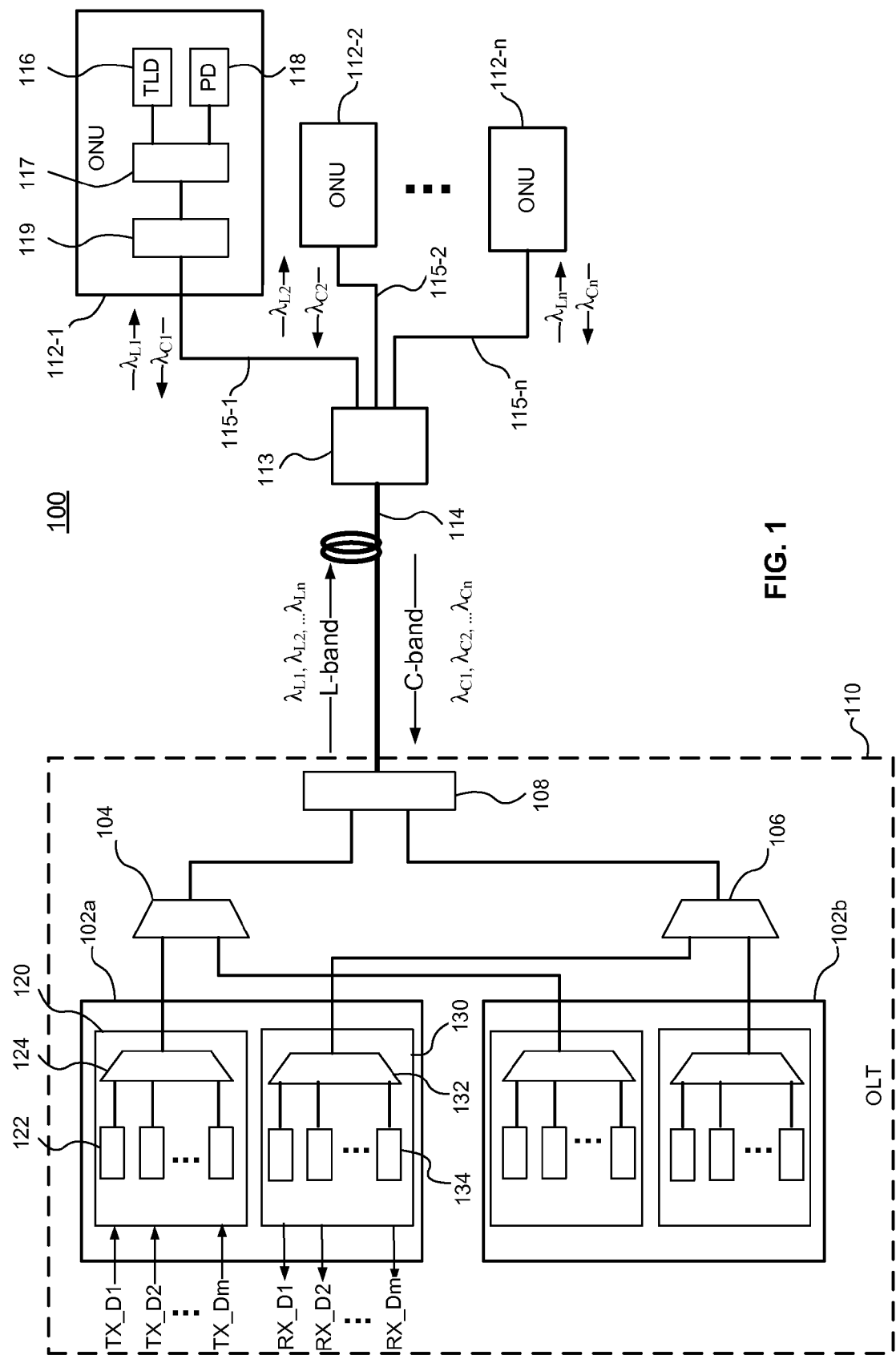
FIG. 1 is a functional block diagram of a wavelength division multiplexed (WDM) passive optical network (PON) including at least one multi-channel optical transceiver, consistent with embodiments of the present disclosure.

Referring to FIG. 1, a WDM-PON 100 including one or more multi-channel optical transceivers 102a, 102b, consistent with embodiments of the present disclosure, is shown and described. The WDM-PON 100 provides a point-to-multi-point optical network architecture using a WDM system. According to one embodiment of the WDM-PON 100, at least one optical line terminal (OLT) 110 may be coupled to a plurality of optical networking terminals (ONTs) or optical networking units (ONUs) 112-1 to 112-n via optical fibers, waveguides, and/or paths 114, 115-1 to 115-n. Although the OLT 110 includes two multi-channel optical transceivers 102a, 102b in the illustrated embodiment, the OLT 110 may include one or more multi-channel optical transceivers.

The OLT 110 may be located at a central office of the WDM-PON 100, and the ONUs 112-1 to 112-n may be located in homes, businesses or other types of subscriber location or premises. A branching point 113 (e.g., a remote node) couples a trunk optical path 114 to the separate optical paths 115-1 to 115-n to the ONUs 112-1 to 112-n at the respective subscriber locations. The branching point 113 may include one or more passive coupling devices such as a splitter or optical multiplexer/demultiplexer. In one example, the ONUs 112-1 to 112-n may be located about 20 km or less from the OLT 110.

The WDM-PON 100 may also include additional nodes or network devices, such as Ethernet PON (EPON) or Gigabit PON (GPON) nodes or devices, coupled between the branching point 113 and ONUs 112-1 to 112-n at different locations or premises. One application of the WDM-PON 100 is to provide fiber-to-the-home (FTTH) or fiber-to-the-premises (FTTP) capable of delivering voice, data, and/or video services across a common platform. In this application, the central office may be coupled to one or more sources or networks providing the voice, data and/or video.

In the WDM-PON 100, different ONUs 112-1 to 112-n may be assigned different channel wavelengths for transmitting and receiving optical signals. In one embodiment, the WDM-PON 100 may use different wavelength bands for transmission of downstream and upstream optical signals relative to the OLT 110 to avoid interference between the received signal and back reflected transmission signal on the same fiber. For example, the L-band (e.g., about 1565 to 1625 nm) may be used for downstream transmissions from the OLT 110 and the C-band (e.g., about 1530 to 1565 nm) may be used for upstream transmissions to the OLT 110. The upstream and/or downstream channel wavelengths may generally correspond to the ITU grid. In one example, the upstream wavelengths may be aligned with the 100 GHz ITU grid and the downstream wavelengths may be slightly offset from the 100 GHz ITU grid.

The ONUs 112-1 to 112-n may thus be assigned different channel wavelengths within the L-band and within the C-band. Transceivers or receivers located within the ONUs 112-1 to 112-n may be configured to receive an optical signal on at least one channel wavelength in the L-band (e.g., $\lambda_{L1}$, $\lambda_{L2}$, ... $\lambda_{Ln}$). Transceivers or transmitters located within the ONUs 112-1 to 112-n may be configured to transmit an optical signal on at least one channel wavelength in the C-band (e.g., $\lambda_{C1}$, $\lambda_{C2}$, ... $\lambda_{Cn}$). Other wavelengths and wavelength bands are also within the scope of the system and method described herein.

The branching point 113 may demultiplex a downstream WDM optical signal (e.g., $\lambda_{L1}$, $\lambda_{L2}$, ... $\lambda_{Ln}$) from the OLT 110 for transmission of the separate channel wavelengths to the respective ONUs 112-1 to 112-n. Alternatively, the branching point 113 may provide the downstream WDM optical signal to each of the ONUs 112-1 to 112-n and each of the ONUs 112-1 to 112-n separates and processes the assigned optical channel wavelength. The individual optical signals may be encrypted to prevent eavesdropping on optical channels not assigned to a particular ONU. The branching point 113 also combines or multiplexes the upstream optical signals from the respective ONUs 112-1 to 112-n for transmission as an upstream WDM optical signal (e.g., $\lambda_{C1}$, $\lambda_{C2}$, ... $\lambda_{Cn}$) over the trunk optical path 114 to the OLT 110.

One embodiment of the ONU 112-1 includes a laser 116, such as a laser diode, for transmitting an optical signal at the assigned upstream channel wavelength ($\lambda_{C1}$) and a photodetector 118, such as a photodiode, for receiving an optical signal at the assigned downstream channel wavelength ($\lambda_{L1}$). The laser 116 may include a tunable laser configured to be tuned to the assigned channel wavelength. This embodiment of the ONU 112-1 may also include a diplexer 117 coupled to the laser 116 and the photodetector 118 and a C+L band filter 119 coupled to the diplexer 117, which allow the L-band channel wavelength ($\lambda_{L1}$) to be received by the ONU 112-1 and the C-band channel wavelength ($\lambda_{C1}$) to be transmitted by the ONU 112-1.

The OLT 110 may be configured to generate multiple optical signals at different channel wavelengths (e.g., $\lambda_{L1}$, $\lambda_{L2}$, ... $\lambda_{Ln}$) and to combine the optical signals into the downstream WDM optical signal carried on the trunk optical fiber or path 114. Each of the OLT multi-channel optical transceivers 102a, 102b may include a multi-channel transmitter optical sub-assembly (TOSA) 120 for generating and combining the optical signals at the multiple channel wavelengths. The OLT 110 may also be configured to separate optical signals at different channel wavelengths (e.g., $\lambda_{C1}$, $\lambda_{C2}$, ... $\lambda_{Cn}$) from an upstream WDM optical signal carried on the trunk path 114 and to receive the separated optical signals. Each of the OLT multi-channel optical transceivers 102a, 102b may thus include a multi-channel receiver optical sub-assembly (ROSA) 130 for separating and receiving the optical signals at multiple channel wavelengths.

One embodiment of the multi-channel TOSA 120 includes an array of lasers 122, such as laser diodes, which may be modulated by respective RF data signals (TX_D1 to TX_Dm) to generate the respective optical signals. The lasers 122 may be modulated using various modulation techniques including external modulation and direct modulation. An optical multiplexer 124, such as an arrayed waveguide grating (AWG), combines the optical signals at the different respective downstream channel wavelengths (e.g., $\lambda_{L1}$, $\lambda_{L2}$, ... $\lambda_{Lm}$). In some embodiments, the lasers 122 may be tunable lasers that generate the optical signals at the respective channel wavelengths. In other embodiments, the lasers 122 may generate optical signals over a band of channel wavelengths and filtering and/or multiplexing techniques may be used to produce the assigned channel wavelengths. In the illustrated embodiment, the OLT 110 further includes a multiplexer 104 for multiplexing the multiplexed optical signal from the multi-channel TOSA 120 in the multi-channel transceiver 102a with a multiplexed optical signal from a multi-channel TOSA in the other multi-channel transceiver 102b to produce the downstream aggregate WDM optical signal.

One embodiment of the multi-channel ROSA 130 includes a demultiplexer 132 for separating the respective upstream channel wavelengths (e.g., $\lambda_{C1}$, $\lambda_{C2}$, ... $\lambda_{Cn}$). An array of photodetectors 134, such as photodiodes, detects the optical signals at the respective separated upstream channel wavelengths and provides the received data signals (RX_D1 to RX_Dm). In the illustrated embodiment, the OLT 110 further includes a demultiplexer 106 for demultiplexing the upstream WDM optical signal into first and second WDM optical signals provided to the respective multi-channel ROSA in each of the transceivers 102a, 102b. The OLT also includes a diplexer 108 between the trunk path 114 and the multiplexer 104 and the demultiplexer 106 such that the trunk path 114 carries both the upstream and the downstream channel wavelengths. The transceivers 102a, 102b may also include other components such as laser drivers, transimpedance amplifiers (TIAs), and control interfaces used for transmitting and receiving optical signals.

In one example, each of the multi-channel optical transceivers 102a, 102b may be configured to transmit and receive 16 channels such that the WDM-PON 100 supports 32 downstream L-band channel wavelengths and 32 upstream C-band channel wavelengths. In one example, the downstream L-band link between the OLT transceivers 102a, 102b and the ONUs 112-1 to 112-n may support a power budget of at least about 26 dB and the upstream C-band link between the ONUs 112-1 to 112-n and the OLT transceivers 102a, 102b may support a power budget of at least about 23 dB. One example of the WDM-PON 100 may operate at 1.25 Gbaud using 8B/10B encoded on-off keying as the modulation scheme. Other data rates and modulation schemes may also be used.

As mentioned above, the upstream and downstream channel wavelengths may span a range of channel wavelengths on the 100 GHz ITU grid. Each of the transceivers 102a, 102b, for example, may cover 16 channel wavelengths in the L-band for the TOSA and 16 channel wavelengths in the C-band for the ROSA such that the transceivers 102a, 102b together cover 32 channels. Thus, the multiplexer 104 may combine 16 channels from one transceiver 102a with 16 channels from the other transceiver 102b, and the demultiplexer 106 may separate a 32 channel WDM optical signal into two 16 channel WDM optical signals. To facilitate use of the multiplexer 104 and the demultiplexer 106, the range of channel wavelengths may skip channels (e.g., 2 channels) in the middle of the range.

Figure 2:
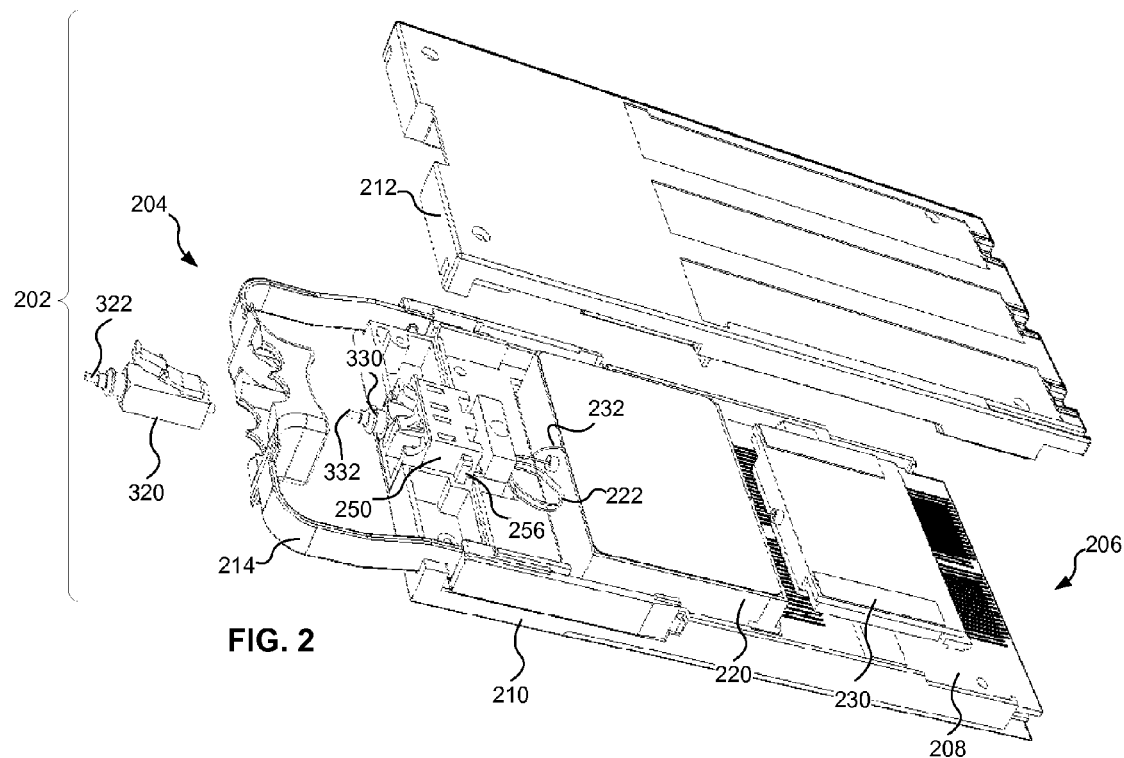
FIG. 2 is an exploded view of a multi-channel optical transceiver including a dual fiber type direct link adapter for optically coupling directly to a TOSA and a ROSA, consistent with an embodiment of the present disclosure.
Figure 3:
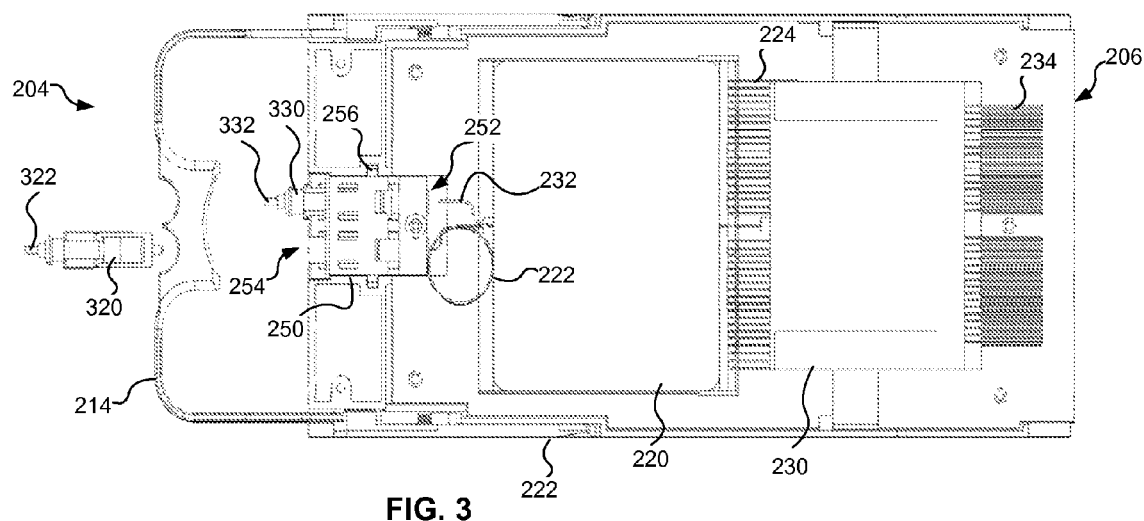
FIG. 3 is a top view inside the multi-channel optical transceiver shown in FIG. 2.
Figure 4:
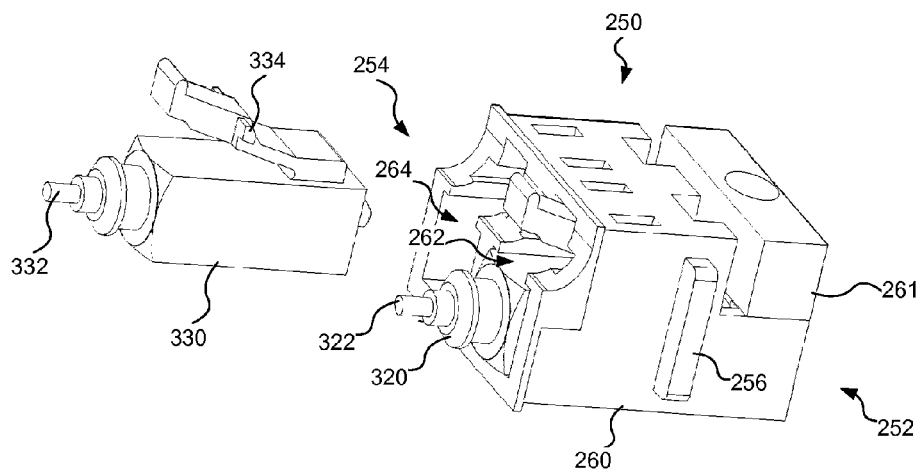
FIG. 4 is a perspective view of one embodiment of the dual fiber type direct link adapter for coupling to first and second LC connectors.
Figure 5:
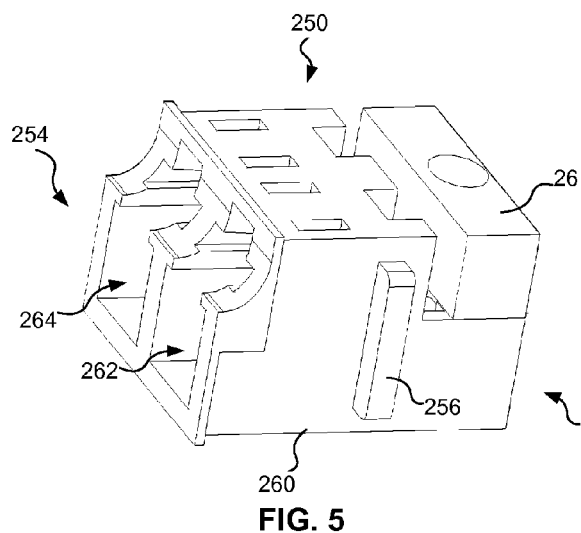
FIGS. 5 and 6 are perspective views of the dual fiber type direct link adapter shown in FIG. 4 without the first and second LC connectors.
Figure 6:
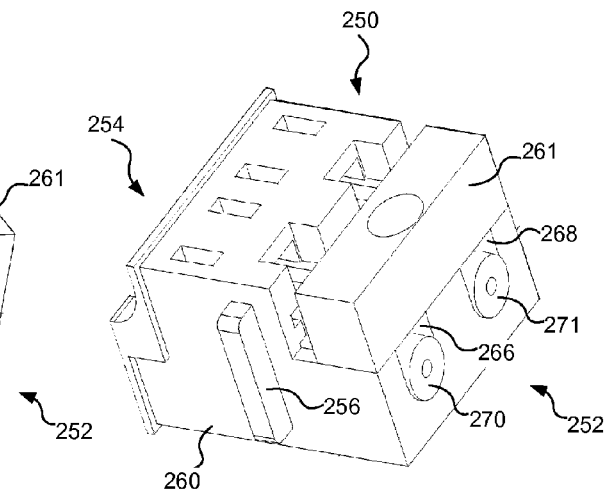
Figure 7:
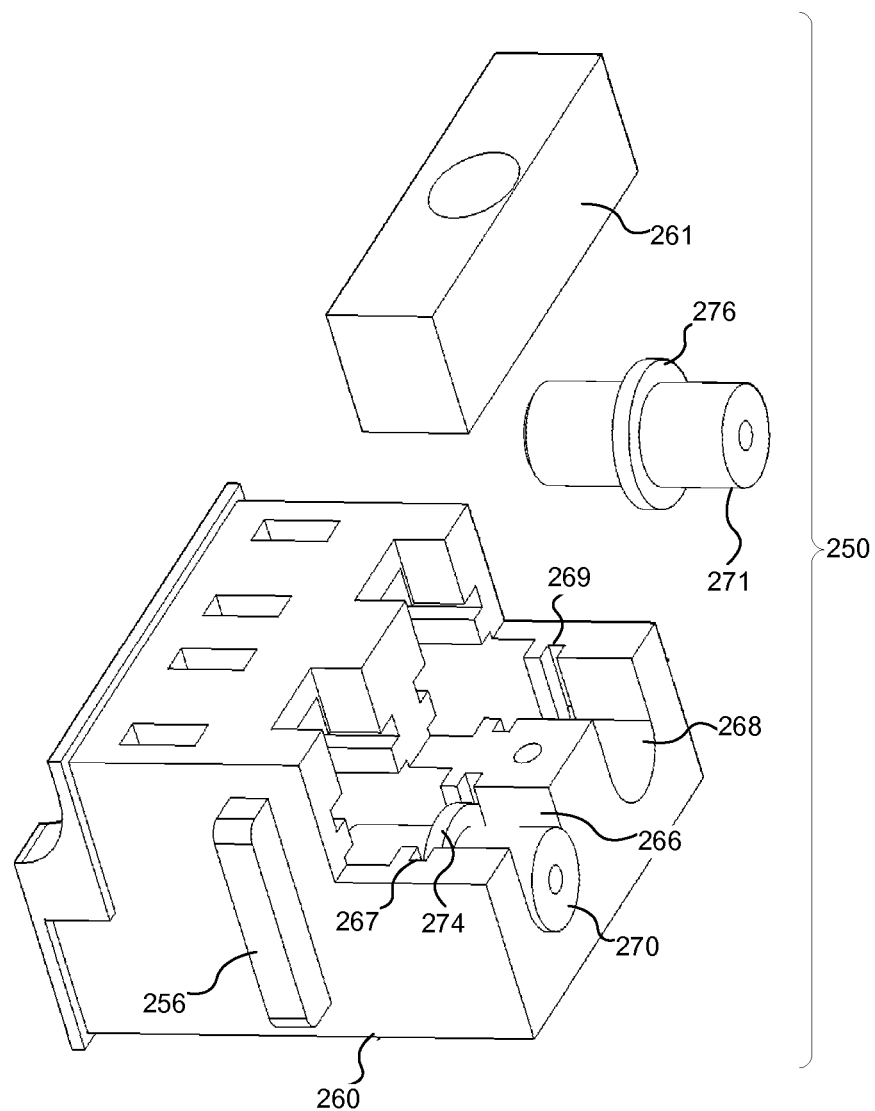
FIG. 7 is an exploded view of the dual fiber type direct link adapter shown in FIG. 4 illustrating the LC optical connecting portion.

Referring to FIGS. 2 and 3, one embodiment of a multi-channel optical transceiver module 202 is shown and described in greater detail. As discussed above, multiple multi-channel transceiver modules may be used in an OLT of a WDM-PON to cover a desired channel range. The transceiver module 202 may thus be designed to have a relatively small form factor with minimal space within the transceiver module 202. The multi-channel optical transceiver module 202 generally provides an optical input and output at one end 204 and electrical input and output at another end 206. The transceiver module 202 includes a transceiver housing 210 containing a multi-channel TOSA 220, a multi-channel ROSA 230, and a dual fiber type direct link adapter 250 directly linked to the TOSA 220 and the ROSA 230 for providing the optical input and output.

The dual fiber type direct link adapter 250 is coupled to the TOSA 220 and to the ROSA 230 with respective optical fibers 222, 232 to provide the direct link between the adapter 250 and both the TOSA 220 and the ROSA 230. The dual fiber type direct link adapter 250 is also configured to receive pluggable optical connectors 320, 330, such as LC connectors, which terminate fiber optic cables 322, 332. When the optical connectors 320, 330 are plugged into the dual fiber type direct link adapter 250, the adapter 250 establishes an optical coupling between the TOSA 220 and the ROSA 230 and the respective optical fibers in the fiber-optic cables 322, 332, which carry the optical signals to and from the transceiver.

The dual fiber type direct link adapter 250 has a direct link end 252 mechanically coupled to the optical fibers 222, 232 and a pluggable connector end 254 configured to receive the pluggable optical connectors 320, 330. The direct link end 252 of the dual fiber type direct link adapter 250 is located inside the transceiver housing 210 and the pluggable connector end 254 faces outside of the transceiver housing 210. The illustrated embodiment of the dual fiber type direct link adapter 250 also includes one or more flanges 256 or other structures that engage the transceiver housing 210 and secure the adapter 250 within the housing 210.

The transceiver module 202 may also include one or more printed circuit boards 208 coupled to the TOSA 220 and/or ROSA 230. The printed circuit board(s) 208 may include electronic components such as laser drivers, transimpedance amplifiers (TIAs), and control interfaces. The TOSA 220 is coupled to conductive leads 224 for carrying the electronic signals including the data to be transmitted by the TOSA 220. The ROSA 230 is coupled to the conductive leads 234 for carrying the electronic signals including the data received by the ROSA 230.

A top housing portion 212 encloses the TOSA 220, the ROSA 230, the adapter 250, the optical fibers 222, 232, and other components within the housing 210. The transceiver housing 210 may have a width of less than about 55 mm, a length of less than about 130 mm, and a height of less than about 10 mm. To fit within this transceiver housing 210, the dual fiber type direct link adapter 250 may have a length from the direct link end 252 to the pluggable connector end 254 of less than about 30 mm. More specifically, one example of a transceiver housing 210 may have a width of 54.6 mm, a length of 110 mm, and a height of about 9.8 mm, and the direct link adapter 250 has a length of about 28 mm. A pull tab 214 may be coupled to the transceiver housing 210 to facilitate handling of the transceiver 202.

Referring to FIGS. 4-7, the dual fiber type direct link adapter 250 is described in greater detail. In the illustrated embodiment, the dual fiber type direct link adapter 250 includes an adapter body portion 260 defining first and second connector receiving regions 262, 264 at the pluggable connector end 254 and defining first and second slots 266, 268 at the direct link end 252. The first and second connector receiving regions 262, 264 are configured to receive the respective pluggable optical connectors 320, 330, such as LC connectors. The first and second slots 266, 268 are configured to receive respective direct link connector assemblies 270, 272, which are mechanically coupled to optical fibers (not shown) directly linking the TOSA and ROSA (not shown). An adapter cover portion 261 covers the slots 266, 268 and retains the direct link connector assemblies 266, 268. The direct link connector assemblies 270, 272 also include flange portions 274, 276 (shown in FIG. 7) that extend into receiving grooves 267, 269 in the respective slots 266, 268 to prevent axial movement and hold the direct link connector assemblies in the slots.

In one embodiment, the dual fiber type direct link adapter 250 is configured to mechanically and optically connect to an LC type optical connector. In other embodiments, the dual fiber type direct link adapter 250 may be configured to connect with other types of pluggable optical connectors. The optical connectors 320, 330 may be mechanically engaged with the dual fiber type direct link adapter 250 when plugged to maintain the optical coupling. The connector 330 includes, for example, a latch 334 that engages a corresponding portion within the adapter body portion 260.

One end of each of the direct link connector assemblies 270, 272 is mechanically coupled to the optical fibers to provide the direct link to the TOSA and ROSA, as described above. The other end of each of the direct link connector assemblies 270, 272 defines a connector receptacle that extends into the respective connector receiving region 262, 264 defined by the adapter body portion 260, as described in greater detail below.

Figure 8:
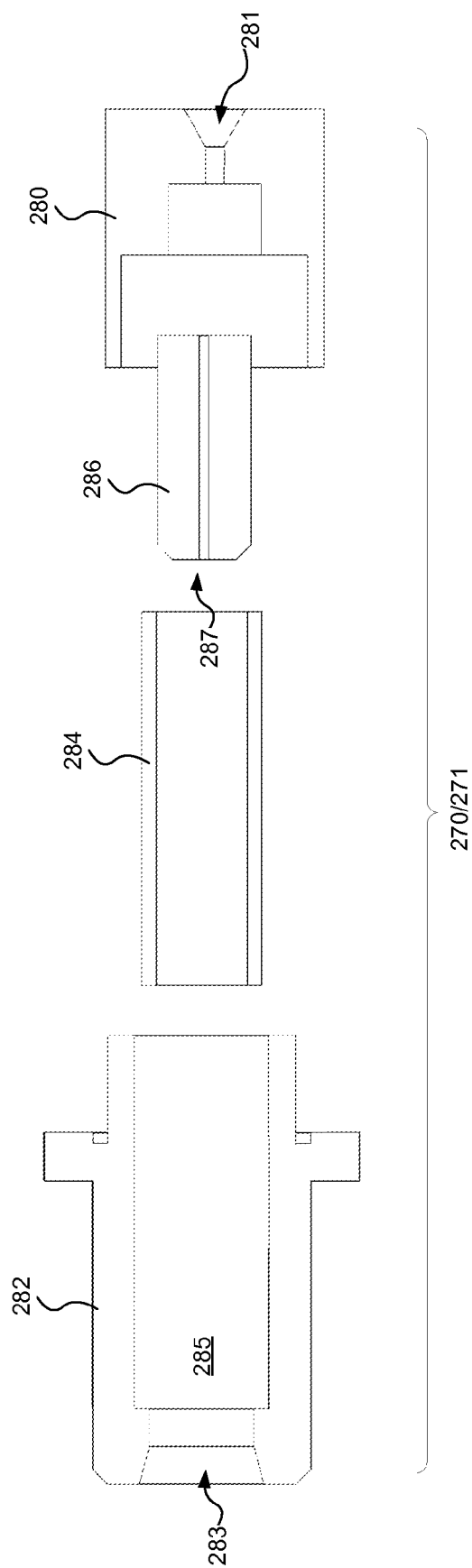
FIG. 8 is a cross-sectional exploded view of the LC optical connecting portion of the dual fiber type direct link adapter shown in FIG. 4.

FIG. 8 shows the direct link connector assembly 270/271 in greater detail. In this illustrated embodiment, the direct link connector assembly 270 includes an outer housing formed by first and second outer housing portions 280, 282 around a sleeve 284, which receives a fiber ferrule 286. A respective one of the optical fibers (not shown) may pass through an opening 281 in the first housing portion 280 and into the fiber ferrule 286. The optical fiber may be secured to the fiber ferrule 286 such that an end face of the optical fiber is located at an optical coupling end 287 of the fiber ferrule 286. The second housing portion 282 and the sleeve 284 define a connector receptacle 285 at the connector coupling end, which receives a fiber ferrule of a pluggable optical connector (not shown) through an opening 283.

Figure 9:
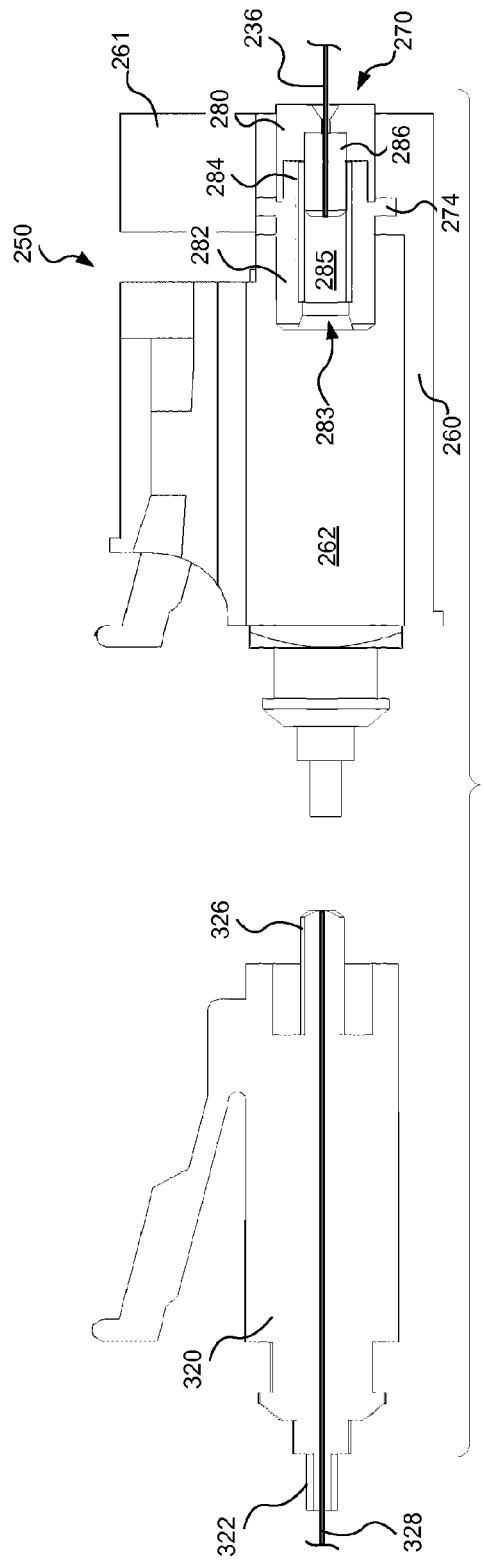
FIGS. 9 and 10 are cross-sectional views of the dual fiber type direct link adapter shown in FIG. 4 with the LC connector disconnected and connected.
Figure 10:
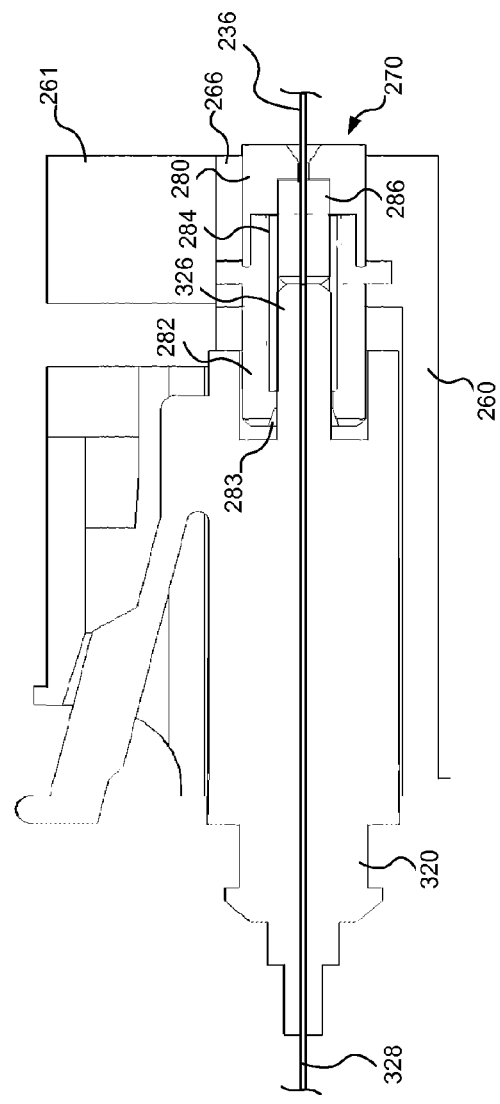

FIGS. 9 and 10 illustrate the connection of a pluggable optical connector 320 (e.g., an LC connector) to the dual fiber type direct link adapter 250. As shown in FIG. 9 and described above, the direct link connector assembly 270 defines a connector receptacle 285 that extends into the connector receiving region 262. The direct link optical fiber 236 extends into the connector assembly 270 and is secured to the fiber ferrule 286 with an end face of the optical fiber 236 exposed for optical coupling. The pluggable optical connector 320 includes a fiber ferrule 326 extending from one end. The optical fiber 328 in the fiber-optic cable 322 coupled to the optical connector 320 extends into the connector 320 and is secured to the fiber ferrule 286 with an end face of the optical fiber 328 exposed for optical coupling.

As shown in FIG. 10, when the optical connector 320 is plugged into the dual fiber type direct link adapter 250, the connector fiber ferrule 326 extends into the connector receptacle 285 and contacts the adapter fiber ferrule 286 such that optical coupling is established between the optical fibers 328, 236. In the illustrated embodiment, the pluggable optical connector 320 is an LC type optical connector and the connector assembly 270 (and connector receptacle 285) is configured to mate with an LC type optical connector.

Accordingly, a dual fiber type direct link adapter, consistent with embodiments described herein, allows connection to a pluggable optical connector, such as an LC connector, while providing a direct optical link to both the TOSA and ROSA in a multi-channel optical transceiver. The direct link connection reduces the size of the adapter and allows a smaller transceiver module with a pluggable optical input and output.

Consistent with an embodiment, a multi-channel transceiver module includes a transceiver housing, a multi-channel transmitter optical subassembly (TOSA) located in the transceiver housing and configured to transmit a wavelength division multiplexed (WDM) optical signal on multiple channel wavelengths, and a multi-channel receiver optical subassembly (ROSA) located in the transceiver housing and configured to receive a wavelength division multiplexed (WDM) optical signal on multiple channel wavelengths. A dual fiber type direct link adapter is located inside the transceiver housing and at one side of the transceiver housing. The dual fiber type direct link adapter has a direct link end located in the transceiver housing and a pluggable connector end facing outside of the transceiver housing. The direct link end of the dual fiber type direct link adapter is coupled to the TOSA with a first optical fiber and coupled to the ROSA with a second optical fiber to provide a direct link between the dual fiber type direct link adapter and the TOSA and the ROSA. The pluggable connector end is configured to receive first and second pluggable optical connectors for optically coupling the TOSA and the ROSA to external optical fibers.

Consistent with another embodiment, a dual fiber type direct link LC adapter includes an adapter body portion defining first and second LC connector receiving regions at an pluggable connector end and defining first and second slots at a direct link end. The dual fiber type direct link LC adapter includes also includes first and second direct link connector assemblies configured to be received in the first and second slots, respectively. Each of the direct link connector assemblies defines an LC connector receptacle at one end. The LC connector receptacle extends into a respective one of the LC connector receiving regions and is configured to receive a portion of an LC connector for optical coupling. Each of the direct link connector assemblies is configured to be mechanically coupled to an optical fiber at another end. The dual fiber type direct link LC adapter further includes an adapter cover portion configured to cover the first and second slots for retaining the direct link connector assemblies in the respective slots.

Consistent with a further embodiment, an optical line terminal comprises at least first and second multi-channel transceivers. Each of the multi-channel transceivers includes a transceiver housing, a multi-channel transmitter optical subassembly (TOSA) located in the transceiver housing and configured to transmit a wavelength division multiplexed (WDM) optical signal on multiple channel wavelengths, and a multi-channel receiver optical subassembly (ROSA) located in the transceiver housing and configured to receive a wavelength division multiplexed (WDM) optical signal on multiple channel wavelengths. A dual fiber type direct link adapter is located inside the transceiver housing and at one side of the transceiver housing. The dual fiber type direct link adapter has a direct link end located in the transceiver housing and a pluggable connector end facing outside of the transceiver housing. The direct link end of the dual fiber type direct link adapter is coupled to the TOSA with a first optical fiber and coupled to the ROSA with a second optical fiber to provide a direct link between the dual fiber type direct link adapter and the TOSA and the ROSA. The pluggable connector end is configured to receive first and second pluggable optical connectors for optically coupling the TOSA and the ROSA to external optical fibers.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A multi-channel transceiver module comprising:
   a transceiver housing;
   a multi-channel transmitter optical subassembly (TOSA) located in the transceiver housing, the TOSA being configured to transmit a wavelength division multiplexed (WDM) optical signal on multiple channel wavelengths;
   a multi-channel receiver optical subassembly (ROSA) located in the transceiver housing, the ROSA being configured to receive a wavelength division multiplexed (WDM) optical signal on multiple channel wavelengths; and
   a dual fiber type direct link adapter located inside the transceiver housing and at one side of the transceiver housing, the dual fiber type direct link adapter having a direct link end located in the transceiver housing and a pluggable connector end facing outside of the transceiver housing, the direct link end of the dual fiber type direct link adapter being coupled to the TOSA with a first optical fiber and coupled to the ROSA with a second optical fiber to provide a direct link between the dual fiber type direct link adapter and the TOSA and the ROSA, the pluggable connector end being configured to receive first and second pluggable optical connectors for optically coupling the TOSA and the ROSA to external optical fibers, wherein the dual fiber type direct link adapter comprises:

an adapter body portion defining first and second slots, each of the first and second slots including at least one groove;

first and second direct link connector assemblies received in the first and second slots, respectively, of the adapter body portion, each of the first and second direct link connector assemblies including at least one flange extending into the groove in the first and second slots, respectively, to prevent axial movement of the first and second direct link connector assemblies, wherein one end of each of the direct link connector assemblies defines a connector receptacle configured to receive a portion of the optical connector for optical coupling, and wherein another end of each of the connector assemblies is directly linked to a respective optical fiber; and an adapter cover portion covering the first and second slots and retaining the first and second direct link connector assemblies in the first and second slots, respectively.

2. The multi-channel transceiver module of claim 1 wherein the dual fiber type direct link adapter is a dual fiber type direct link LC adapter including an LC connector end configured to receive first and second LC connectors.

3. The multi-channel transceiver module of claim 1 wherein a length of the dual fiber type direct link adapter from the direct link end to the pluggable connector end is less than 30 mm.

4. The multi-channel transceiver module of claim 1 wherein a length of the transceiver housing is less than 130 mm, and a width of the transceiver housing is less than 55 mm.

5. The multi-channel transceiver module of claim 1 wherein each of the direct link connector assemblies comprises a fiber ferrule receiving a respective one of the optical fibers and a sleeve around the fiber ferrule, and wherein the sleeve defines at least a portion of the connector receptacle.

6. The multi-channel transceiver module of claim 1 wherein each of the direct link connector assemblies further comprises an outer housing around the fiber ferrule and sleeve, the outer housing defining at least a portion of the connector receptacle and including the flange portion for securing the direct link connector assembly.

7. The multi-channel transceiver module of claim 1 wherein the connector receptacle is configured to mate with an LC connector.

8. The multi-channel transceiver module of claim 1 wherein the dual fiber type direct link adapter defines first and second connector receiving regions configured to receive respective first and second pluggable optical connectors, and wherein the connector receptacles extend into the connector receiving regions.

9. An optical line terminal comprising:
at least first and second multi-channel transceivers, each of the multi-channel transceivers comprising:
a transceiver housing;
a multi-channel transmitter optical subassembly (TOSA) located in the transceiver housing, the TOSA being configured to transmit a wavelength division multiplexed (WDM) optical signal on multiple channel wavelengths;
a multi-channel receiver optical subassembly (ROSA) located in the transceiver housing, the ROSA being configured to receive a wavelength division multiplexed (WDM) optical signal on multiple channel wavelengths; and
a dual fiber type direct link adapter located inside the transceiver housing and at one side of the transceiver housing, the dual fiber type direct link adapter having a direct link end located in the transceiver housing and a pluggable connector end facing outside of the transceiver housing, the direct link end of the dual fiber type direct link adapter being coupled to the TOSA with a first optical fiber and coupled to the ROSA with a second optical fiber to provide a direct link between the dual fiber type direct link adapter and the TOSA and the ROSA, the pluggable connector end being configured to receive first and second pluggable optical connectors for optically coupling the TOSA and the ROSA to external optical fibers, wherein the dual fiber type direct link adapter comprises:
an adapter body portion defining first and second slots, each of the first and second slots including at least one groove;
first and second direct link connector assemblies received in the first and second slots, respectively, of the adapter body portion, each of the first and second direct link connector assemblies including at least one flange extending into the groove in the first and second slots, respectively, to prevent axial movement of the first and second direct link connector assemblies, wherein one end of each of the direct link connector assemblies defines a connector receptacle configured to receive a portion of the optical connector for optical coupling, and wherein another end of each of the connector assemblies is directly linked to a respective optical fiber; and
an adapter cover portion covering the first and second slots and retaining the first and second direct link connector assemblies in the first and second slots, respectively.

10. The optical line terminal of claim 9 wherein the dual fiber type direct link adapter is a dual fiber type direct link LC adapter including an LC connector end configured to receive first and second LC connectors.

11. The optical line terminal of claim 9 wherein the wherein a length of the dual fiber type direct link adapter from the direct link end to the pluggable connector end is less than 30 mm.

12. The optical line terminal of claim 9 wherein each of the direct link connector assemblies comprises a fiber ferrule receiving a respective one of the optical fibers and a sleeve around the fiber ferrule, and wherein the sleeve defines at least a portion of the connector receptacle.

* * * * *